United States Patent [19]
Conley

[11] 3,789,802
[45] Feb. 5, 1974

[54] AUTOMATIC POULTRY EGG COLLECTOR

[76] Inventor: John L. Conley, 3870 Chino Ave., Chino, Calif. 91710

[22] Filed: May 12, 1971

[21] Appl. No.: 142,511

[52] U.S. Cl. .............................................. 119/48
[51] Int. Cl. ........................................... A01k 31/14
[58] Field of Search ...................... 119/48; 120/156

[56] References Cited
UNITED STATES PATENTS

| | | | |
|---|---|---|---|
| 3,626,905 | 12/1971 | Giesbert | 119/48 |
| 2,710,682 | 6/1955 | Coll | 119/48 X |
| 478,263 | 7/1892 | Moss | 198/156 |
| 2,264,156 | 11/1941 | Apple | 119/48 |
| 2,745,379 | 5/1956 | Schmidt | 119/48 |

*Primary Examiner*—Hugh R. Chamblee
*Attorney, Agent, or Firm*—Boniard I. Brown

[57] ABSTRACT

An automatic egg collector for an automated poultry handling system having a poultry cage battery composed of tiered banks of poultry cages with inclined floors along which eggs roll from the cages onto feeder conveyors alongside the cage tiers. The several feeder conveyors of each cage bank feed a common transfer conveyor which transfers eggs from the feeder conveyors to an overhead outfeed conveyor. The outfeed conveyor transports the eggs from all the transfer conveyors of the cage battery to an egg receiver.

17 Claims, 8 Drawing Figures

PATENTED FEB 5 1974 3,789,802

INVENTOR
JOHN L. CONLEY
BY
Boniard I. Brown
ATTORNEY

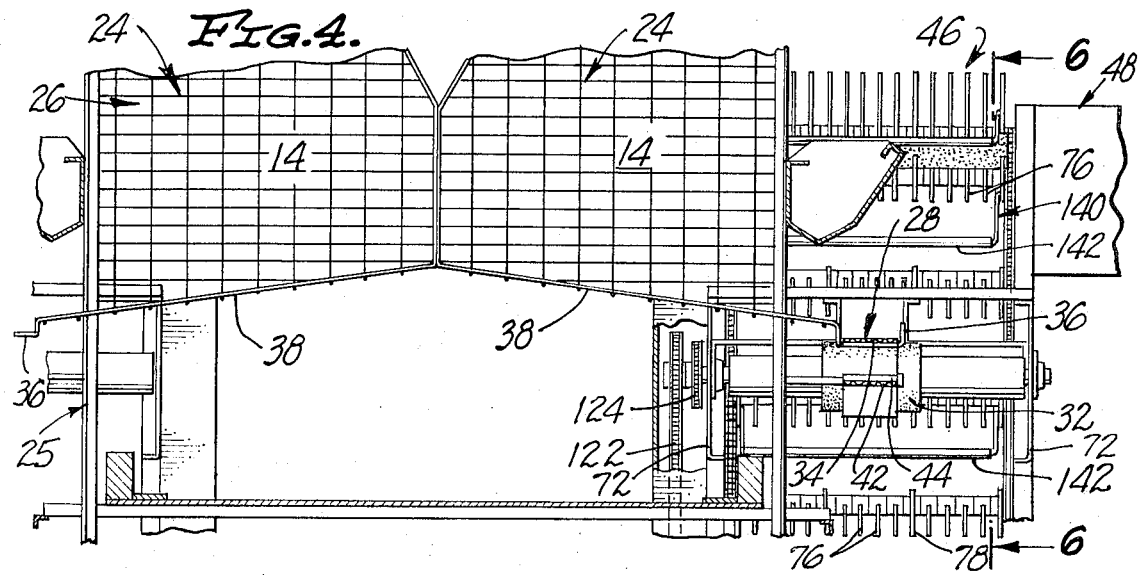
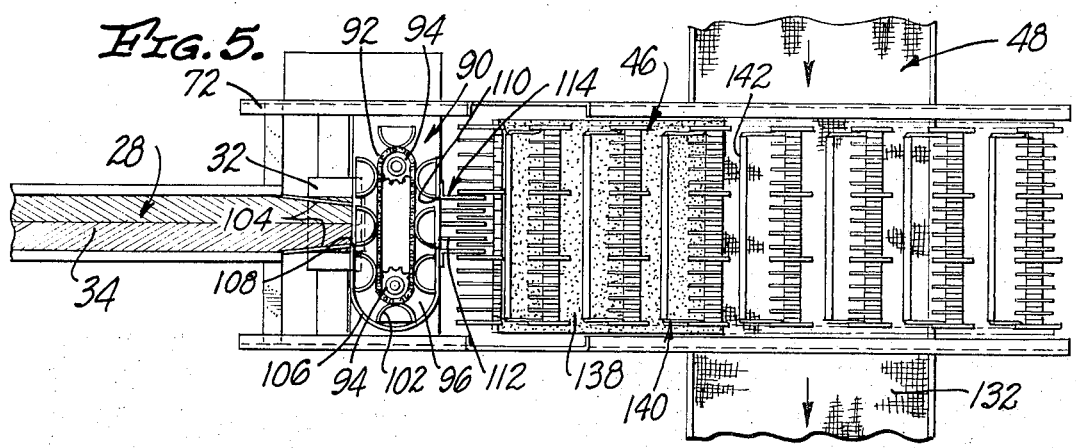
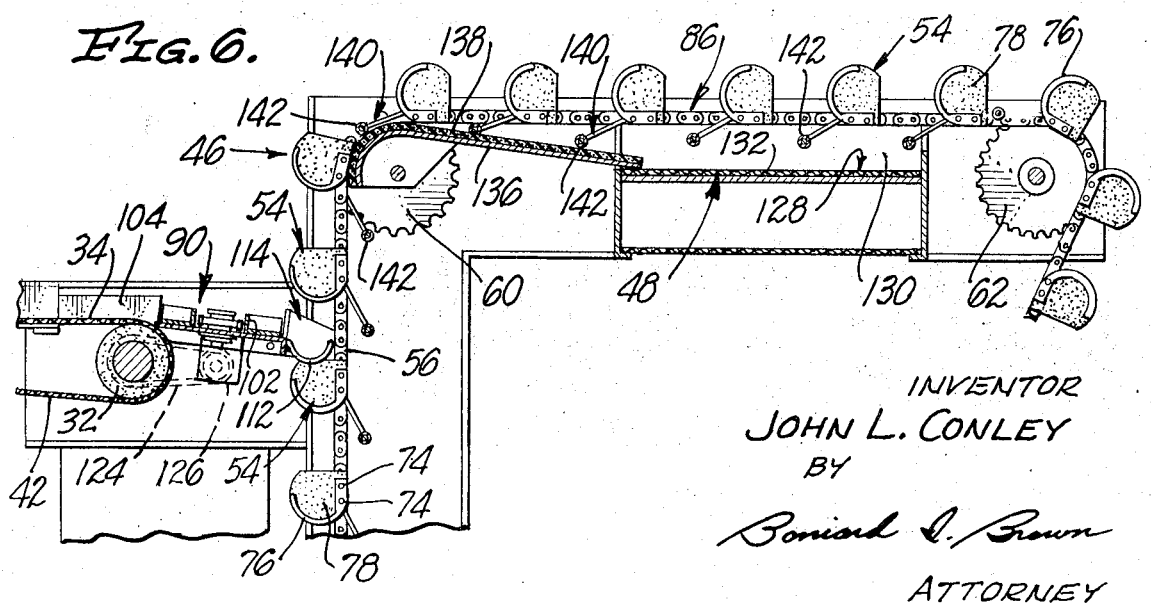

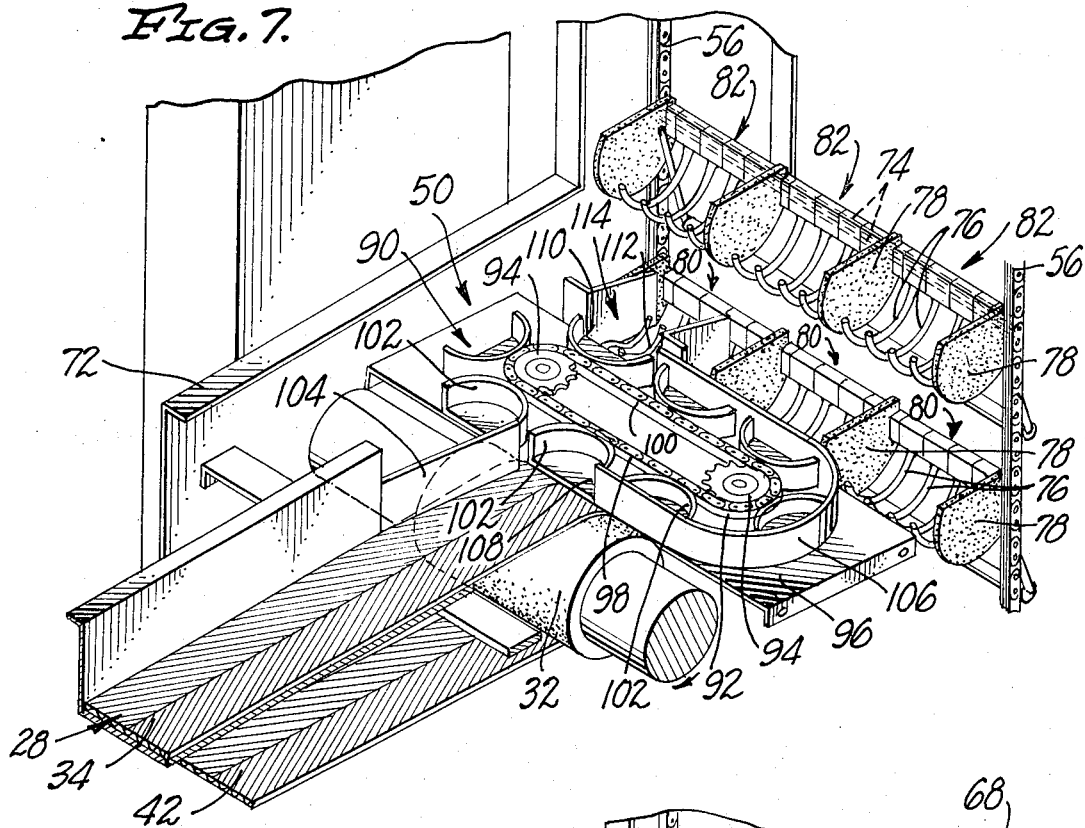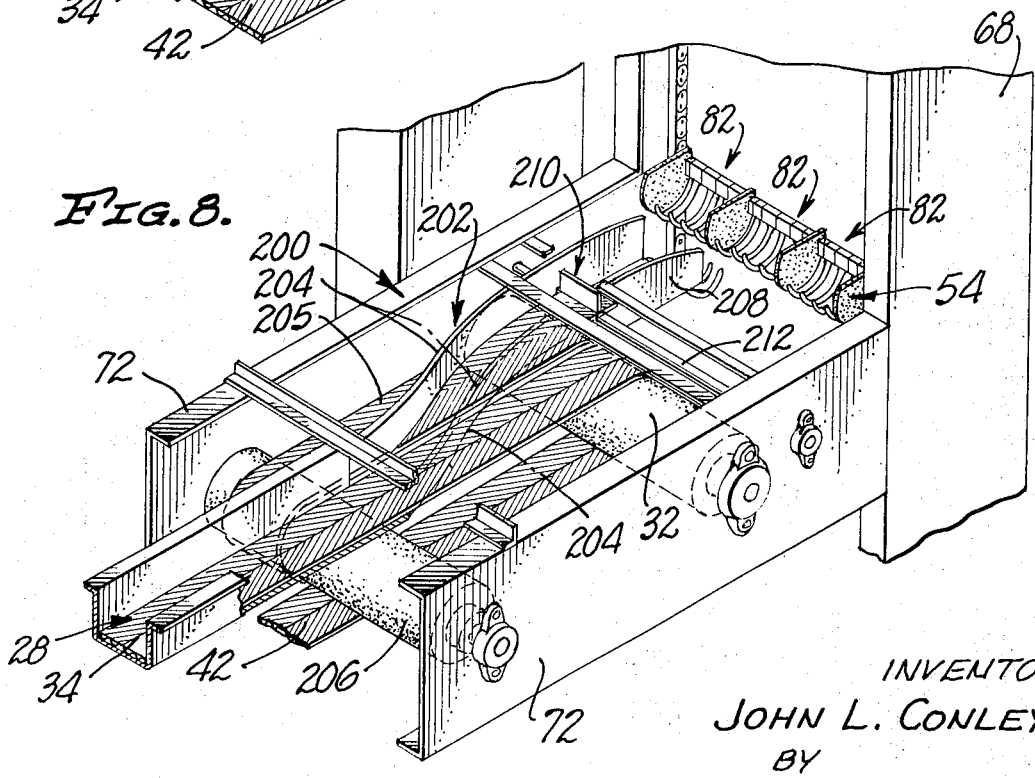

AUTOMATIC POULTRY EGG COLLECTOR

RELATED APPLICATIONS

Reference is made herein to copending applications Ser. No. 142,519, filed May 12, 1971, and entitled "Automatic Feeder," and Ser. No. 142,518, filed May 12, 1971, and entitled "Automatic Animal Dropping Pit Cleaner.

BACKGROUND OF THE INVENTION

1. Field of the Invention:

This invention relates generally to the field of poultry egg production and more particularly in an improved automatic egg collector for automated poultry handling apparatus.

2. Discussion of the Prior Art:

The ever increasing demand for food products requires constant improvement in and automation of food production techniques. This applies to all types of food production including poultry egg production.

The automation of poultry egg production requires an automated poultry handling system. Broadly speaking, such an automated poultry handling system embodies three basic automated systems which are a feeding system for supplying the poultry with feed, a litter removal system for removing the litter from the poultry cages, and an egg gathering system for collecting the eggs produced by the poultry. The aforementioned copending applications disclose an automatic feeder and an automatic litter removal system or dropping pit cleaner for such an automated poultry system. The present invention provides an improved egg collector for an automated poultry system.

A variety of automatic egg collection systems have been devised. Automatic systems of this kind, for example, are disclosed in U.S. Pat. Nos. 2,264,156; 2,710,682; 2,745,379; 2,886,173; 2,987,038; 3,033,162 and 3,159,139.

SUMMARY OF THE INVENTION

In the automated egg collection system of the present invention, the poultry are housed in cages arranged in tiered banks. Each cage bank has several levels or tiers of cages each containing a number of cages disposed side by side in a row. In the particular inventive embodiment selected for illustration, the cage banks are arranged in pairs with the two cage banks of each pair disposed back to back to form a block of cages. The cage blocks are arranged in spaced side b side relation to form a battery of cages. The spaces between the cage blocks provide access aisles.

Extending along the front side of each row or tier of cages in each cage bank is a feeder conveyor. The floors of the poultry cages slope downwardly in the direction of the feeder conveyors so that eggs roll from the cages onto the feeder conveyors. The several feeder conveyors of each cage bank feed a common transfer conveyor located at one end of the bank. This transfer conveyor transfers the eggs from all its feeder conveyors to an overhead outfeed conveyor. The outfeed conveyor receives eggs from all the transfer conveyors of the cage battery and transports the eggs to an egg receiver.

The overhead location of the outfeed conveyor and the arrangement of the transfer conveyors, whereby the latter transport eggs from their feeder conveyors to the outfeed conveyor constitutes an important feature of the invention. This feature substantially reduces the floor space occupied by the poultry tending apparatus and provides unrestricted access to the poultry cages at any position along the cage battery. Such reduced floor space and unrestricted access is in contrast to existing poultry tending apparatus in which the outfeed conveyor is located on floor level and thus increases the occupied floor space and blocks free access to the poultry cages.

Another important feature of the invention resides in the manner in which the transfer conveyors pick up eggs from their feeder conveyors and transfer the eggs to the outfeed conveyor without danger of breakage. According to this feature, eggs from the feeder conveyors are deposited in egg transfer baskets. The transfer conveyor has egg holders formed by fingers which travel upwardly through egg transfer baskets in such a way as to gently elevate eggs from these baskets. Upon emerging from the upper feeder conveyor egg transfer basket, the egg holders travel horizontally toward and finally over the outfeed conveyor. As the holders enter their horizontal run, they are rotated to deposit their eggs gently upon a cushioned inclined ramp leading to the outfeed conveyor. The eggs roll along this ramp onto the outfeed conveyor. Successive eggs on the ramp are spaced and their rolling speed is controlled by egg retarders on the transfer conveyor in such a way that the eggs arrive on the outfeed conveyor without danger of breakage.

The method of feeding eggs from the feeder conveyors to the transfer conveyors is also unique and permits each transfer conveyor to service several feeder conveyors without the eggs from a lower feeder conveyor blocking entrance onto the transfer conveyor of eggs from an upper feeder conveyor. According to this feature, each transfer conveyor has a number of laterally spaced egg receiving sections equal to the number of and associated with its feeder conveyors, respectively. At the outfeed end of each feeder conveyor are transfer means for directing eggs from the conveyor to the appropriate section of the transfer conveyor. In other words, each section of the transfer conveyor services only one feeder conveyor.

BRIEF DESCRIPTION OF THE DRAWINGS

FIG. 4 is a section taken on line 4—4 in FIG. 3;

FIG. 5 is a view looking in the direction of the arrows 5—5 in FIG. 3;

FIG. 6 is an enlarged section taken on line 6—6 in FIG. 4;

FIG. 7 is an enlarged perspective view of one portion of the egg gathering system; and FIG. 8 illustrates a modification of the egg gathering system.

DESCRIPTION OF THE PREFERRED EMBODIMENT

Figure 1:
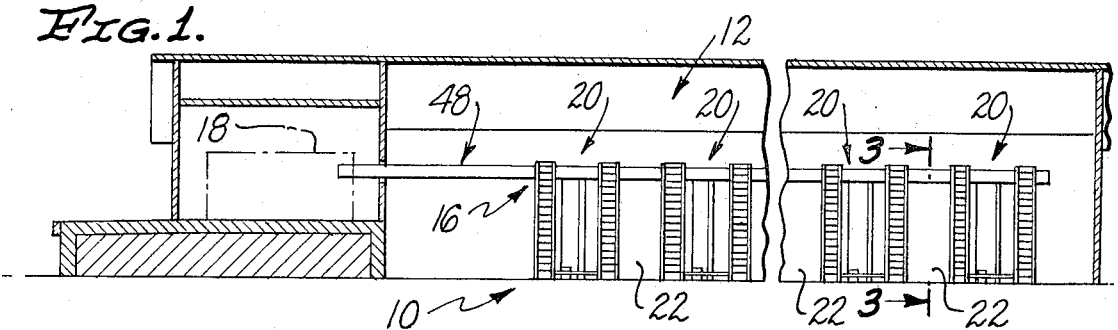
FIG. 1 is an end elevation of a poultry egg gathering system according to the invention.

The automated egg gathering system 10 of the invention selected for illustration in the drawings is installed on a battery 12 of poultry cages 14 for housing the egg laying poultry and includes conveyor means 16 for automatically transporting eggs from the cages to an egg receiver 18. The cage battery 12 comprises a number of blocks 20 of cages arranged side by side in a row with access aisles 22 between the adjacent cage blocks. Each cage block 20 is composed of two tiered banks 24 of cages arranged back to back and supported on a frame 25. Each cage bank has several levels or tiers 26 of cages disposed side by side in a row.

Egg conveyor means 16 includes feeder conveyors 28 for each cage bank 24. The feeder conveyors for each cage bank extend along the front sides of the several levels or tiers 26 of cages in the bank. Each feeder conveyor has an endless conveyor belt 30 trained at its ends about rollers 32 on the cage frame 25 at the ends of the respective cage tier. Referring to FIG. 4, the upper run 34 of each conveyor belt 30 extends through and is supported by the bottom wall of a channel 36 on the cage frame 25. In the particular inventive embodiment illustrated, the wire mesh floors 38 of the poultry cages 14 in each cage tier 26 extend forwardly of the front walls of the cages and are bent to form the respective conveyor channel 36. The cages are secured or lashed together and the cage assembly is bolted (not shown) to the frame 25 by means of the cage fronts at a proper elevation. The lower run 42 of each conveyor belt 30 extends below the supporting channel 36 for its upper run 34 and is supported at intervals by rollers 44 on the cage frame.

Figure 2:
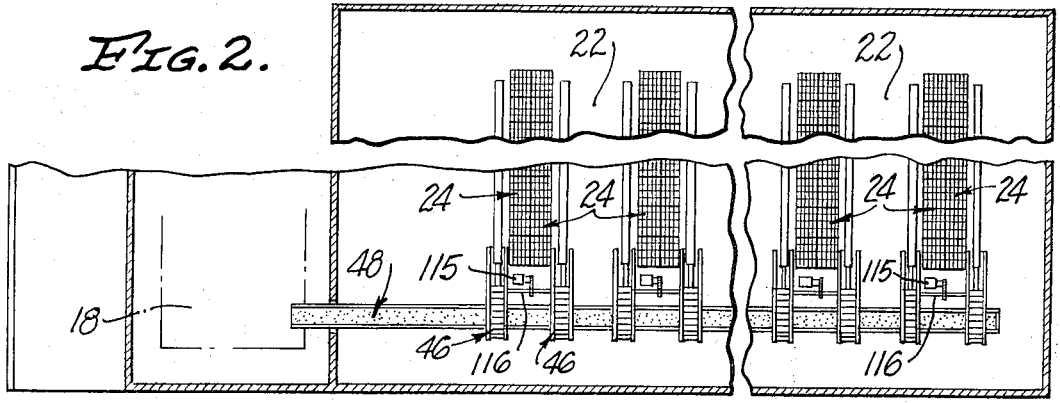
FIG. 2 is a plan view of the egg gathering system.
Figure 3:
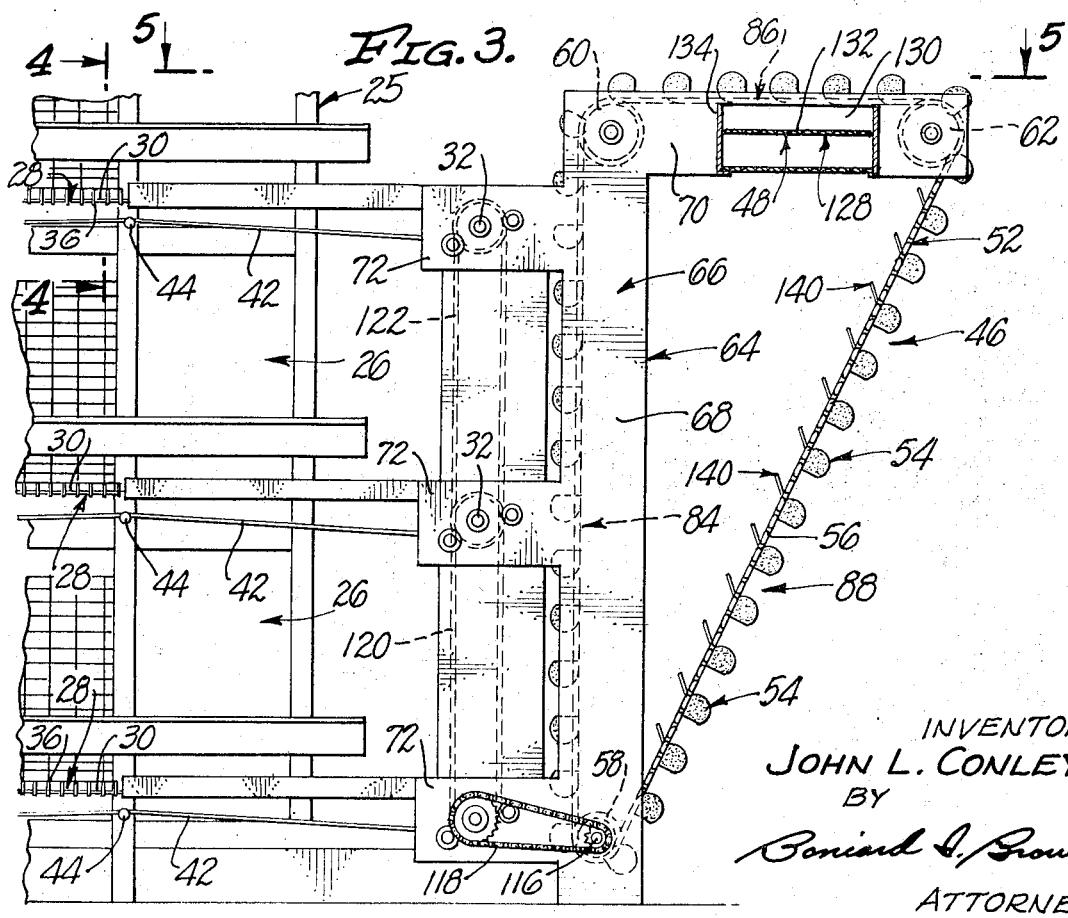
FIG. 3 is an enlarged section taken on line 3—3 in FIG. 1.

As shown best in FIG. 4, the floor 38 of each cage 14 slopes downwardly at a small angle in the direction of the adjacent feeder conveyor 28. Accordingly, eggs laid by poultry in the cages roll toward the adjacent feeder conveyors. The front walls of the cages provide large openings through which the eggs may freely roll onto the upper runs 34 of the feeder conveyor belts 30. The manner in which the conveyor belts are driven will be explained presently. Suffice it to say at this point, that all of the feeder conveyor belts are driven in such a way that the upper belt runs 34 travel in the downward direction in FIG. 2 and to the right in FIGS. 3, 5 and 6. The right-hand ends of the feeder conveyors 28 in the latter figures are hereafter referred to as their outfeed ends.

Located at the outfeed ends of the several feeder conveyors 28 for each cage bank 24 is a transfer conveyor 46 for transferring eggs from the feeder conveyors to a main overhead outfeed conveyor 48, and transfer means 50 for directing the eggs from each feeder conveyor to the transfer conveyor. Referring particularly to FIGS. 3-7, each transfer conveyor 46 has an endless conveyor member 52 with egg holders 54. The conveyor member 52 comprises two endless sprocket chains 56 which are trained about three sets of sprockets 58, 60, 62 on the transfer conveyor frame 64. This conveyor frame has a pair of generally inverted L-shaped side frame members 66 with vertical portions 68 which extend upwardly across the outfeed ends of the feeder conveyors 28 at opposite sides of the conveyors and upper portions 70 which extend horizontally from the upper ends of the vertical portions. The transfer conveyor frame 64 is attached to the respective cage frame 25. At the level of each cage tier 26 in the respective cage bank 24, the transfer conveyor frame 64 has a pair of plates 72 which project from the vertical frame portions 68 toward and straddle the outfeed end of the corresponding feeder conveyor 28. As shown best in FIG. 7, each pair of frame plates 72 rotatably support the adjacent feeder conveyor belt roller 32.

Returning to the transfer conveyor member 52, its egg holders 54 comprise rods 74 extending between and releasably attached at their ends to the transfer conveyor chains 56 at uniformly spaced intervals therealong. Threaded side by side on each rod 74 are curved fingers 76 and dividers 78. Dividers 78 separate the fingers 76 into a number of banks 80 equal to the number of feeder conveyors 28 and hence cage tiers 26 in each cage bank 24. In the particular embodiment shown, each cage bank has three tiers and three feeder conveyors. Accordingly, the conveyor fingers 76 on each rod 74 of the transfer conveyor are divided into three banks 80. The corresponding finger banks 80 of the transfer conveyor constitute three laterally spaced egg receiving sections 82. As explained below, these egg receiving sections are associated with the three feeder conveyors 28, respectively, of the corresponding cage bank 24 and receive eggs only from their associated conveyors. Rods 74 and their fingers 76 and dividers 78 may be easily removed and replaced when necessary. That is to say, an entire rod-finger-divider assembly may be replaced, or individual fingers or dividers may be replaced by unthreading them from the rods.

Returning to FIG. 3, the transfer conveyor member 52 has a vertical run 84 extending upwardly between the vertical conveyor frame portion 68 and past the outfeed ends of the corresponding feeder conveyors 28, an upper horizontal run 86 between the horizontal conveyor frame portions 70 extending over the outfeed conveyor 48, and a diagonal return run 88. The transfer conveyor fingers 76 are curved and secured in fixed positions relative to the conveyor chains 56 such that the fingers along the vertical conveyor run 84 form upwardly opening egg receiving cups or troughs which constitute the egg holders 54. When the egg holders enter the upper horizontal conveyor run 86, the holders are rotated 90° to positions wherein they open horizontally.

As indicated earlier, each section 82 of the transfer conveyor 46 receives eggs only from its associated feeder conveyor 28. The transfer means 50 perform the function of directing the eggs from each feeder conveyor to the corresponding egg receiving section of the transfer conveyor. In the invention embodiment under discussion, the transfer means 50 for each feeder conveyor 28 comprises a carrousel conveyor 90. Turning to FIG. 7, the carrousel conveyor for each feeder conveyor is located between the outfeed end of the feeder conveyor and the vertical run 84 of the transfer conveyor. This carrousel conveyor comprises a sprocket chain 92 trained about a pair of horizontal sprockets 94 rotatably supported on a horizontal plate 96 between and fixed to the adjacent transfer conveyor frame plates 72. Sprocket chain 92 has runs 98, 100 normal to the feeder conveyor 28 and carries egg receiving cups 102. About the carrousel conveyor 90 are wall members 104, 106 defining an infeed opening 108 from the feeder conveyor 28 to the conveyor chain run 98 and an outfeed opening 110 from the conveyor chain run 100 to the transfer conveyor 46. This outfeed opening opens to the egg receiving section 82 of the transfer conveyor associated with the respective feeder conveyor 28. Along the sides of the outfeed end of the feeder conveyor are side walls which guide eggs arriving on the feeder conveyor into the carrousel conveyor infeed opening 108.

The eggs entering the infeed opening 108 enter cups 102 of the carrousel conveyor 90 and are transported from the infeed opening to the conveyor outfeed opening 110. The carrousel conveyor support plate 96 slopes downwardly at a slight angle toward the transfer conveyor 46 so that eggs arriving at the outfeed opening roll from their carrousel conveyor cups 102, through the outfeed opening, toward the transfer conveyor. Fixed to the edge of the support plate 96 and projecting into the path of the egg holders 54 on the transfer conveyor 46 are curved fingers 112 forming a stationary egg receiving basket 114 into which roll the eggs emerging through the outfeed opening 110. The basket fingers 112 and transfer conveyor fingers 76 are laterally displaced so that the conveyor fingers may pass freely between the basket fingers to pick up eggs from the basket.

The feeder conveyors 28, transfer conveyors 46, and carrousel conveyors 90 of each cage block 20 are driven by a motor 115 which drives a shaft 116 extending between the lower ends of the transfer conveyors and mounting the lower transfer conveyor sprockets 58. The transfer conveyors 46 of each cage block are thus driven directly from the shaft 116. The feeder conveyors 28 of each cage block are driven from the driving shaft 116 through chain drives 118, 120, 122 including sprockets on the rollers 32 at the outfeed ends of the feeder conveyors. Each carrousel conveyor 90 is driven from its feeder conveyor 28 through a chain drive 124 to a right angle drive 126 connected to one carrousel sprocket 94.

From the description to this point, it will be understood that eggs laid by poultry in the cages 14 roll onto the adjacent feeder conveyors 28 which carry the eggs to their respective egg transfer means 50. Each egg transfer means transfers eggs from its feeder conveyor to the corresponding egg receiving section 82 of the transfer conveyor 46. This egg transfer action involves movement of eggs in succession by the carrousel conveyor 90 from its infeed opening 108 to its outfeed opening 110. Upon arrival at the outfeed opening, each egg rolls from the carrousel conveyor through the outfeed opening into the egg transfer basket 114. The fingers 76 of the next egg holder 54 on the transfer conveyor 46 pass between the basket fingers 112 to pick up the egg from the basket. The carrousel and transfer conveyors are driven in unison in such a way that the carrousel conveyors deliver eggs to their respective egg baskets just prior to arrival of the transfer conveyor egg holders at the baskets, such that each egg holder picks up eggs from the baskets. It is significant to note here that since the eggs from the several feeder conveyors of each cage bank are directed to different egg receiving sections of their transfer conveyor, the eggs entering the transfer conveyor from a lower feeder conveyor do not block entrance to the transfer conveyor of eggs from an upper feeder conveyor. Each transfer conveyor carries the eggs from its feeder conveyors upwardly to the horizontal transfer conveyor run 86.

As noted earlier, the upper horizontal run 86 of each transfer conveyor 46 extends over the outfeed conveyor 48. This outfeed conveyor comprises an endless conveyor belt 128 which passes through openings 130 in the upper horizontal portions of the transfer conveyor frames 64. The upper run 132 of the conveyor belt 128 extends through and is supported by the bottom wall of a conveyor channel 134 supported by and extending through the transfer conveyor frames. Conveyor belt 128 is driven by a motor in a direction such that the upper belt run 132 travels toward the egg receiver 18.

Mounted on the upper horizontal portion of each transfer conveyor frame 64, below the upper horizontal run 86 of the transfer conveyor, is an inclined ramp 136. The upper surface of this ramp is furnished by a layer 138 of resilient material, such as foam rubber. Ramp 136 slopes downwardly toward and extends slightly over one edge of the upper run 132 of the outfeed conveyor belt 128. As the egg holders 54 of each transfer conveyor 46 enter the upper horizontal transfer conveyor run 86, the holders are rotated 90° to positions wherein the holders open horizontally, as shown best in FIG. 6. In these egg holder positions, eggs within the holders drop onto the underlying cushioned ramp 136 and roll downwardly along the ramp onto the upper run 132 of the outfeed conveyor belt 128 which then carries the eggs to the egg receiver 18.

According to an important feature of the invention, the rolling eggs on the inclined ramp 136 of each transfer conveyor 46 are spaced and their rolling speed is controlled to assure arrival of the eggs on the outfeed conveyor 48 without danger of breakage. To this end, each transfer conveyor member 52 is equipped with egg retarders 140. Each egg retarder comprises a roller 142 extending crosswise of the transfer conveyor member 52 and pivotally supported on the conveyor member by hinged arms 144. As shown best in FIG. 6, there is one egg retarder for each transfer conveyor egg holder 54. The roller 142 of each retarder trails it respective egg holder. The egg retarders 140 of each transfer conveyor are arranged in such a way that during their movement along the upper horizontal transfer conveyor run 86, the retarders engage the eggs deposited on the underlying ramp 136 from the following egg holder 54 to regulate the rolling speed of the eggs and prevent the latter from striking other eggs on the ramp and on the outfeed conveyor 48. Arrival of the eggs on the outfeed conveyor without breakage is thereby assured.

The overhead location of the outfeed conveyor 48 and the arrangement of the transfer conveyors 46 whereby the latter conveyors transfer eggs from the feeder conveyors 28 to the outfeed conveyor constitutes an important feature of the invention. This conveyor arrangement permits free access to the aisles 22 between the cage blocks 20 at any point along the cage battery 12.

FIG. 8 shows a modified egg transfer means 200 for each feeder conveyor 28. This modified transfer means comprises simply an egg transfer guide 202 having side walls 204 which lead from the respective feeder conveyor 28 to the corresponding egg receiving section 82 of the adjacent transfer conveyor 46. A second auxiliary conveyor belt 205 alongside the feeder conveyor belt 30 and trained about the feeder conveyor roller 32 and an idler roller 206 cooperate with the feeder conveyor belt to move incoming eggs along the transfer guide 202 to an egg basket 208 at the end of the guide like the egg baskets 114 in the earlier inventive embodiment. It should be noted here that the extra conveyor belt 204 is required only at the cage tiers 26 at which eggs are transferred from feeder conveyors 28 to either outside egg receiving section 82 of the corresponding transfer conveyor 46. Only the feeder conveyor belt 30 is required at the tiers at which eggs are fed to the center egg receiving sections of the transfer conveyor.

Located within the egg transfer guide 202 between the outfeed ends of the conveyor belts 30, 204 is a rotary paddle-like gate 210 supported on a rotary shaft 212 on the adjacent transfer conveyor frame 64. Shaft 212 is driven by means, not shown, from the adjacent feeder conveyor roller 32 in timed relation to the transfer conveyor. Paddle gate 210 passes eggs successively to the outfeed end of the egg transfer guide 202 which has a sloping floor along which the eggs roll into the egg basket 208. The rotation of the paddle gate is timed with the movement of the transfer conveyor so that the successive egg holders 54 on the transfer conveyor pick up eggs from the basket as in the earlier described embodiment.

What is claimed as new in support of Letters Patent is:

1. An automatic egg collector for an automated poultry handling system having a battery of poultry cages, comprising:

an overhead outfeed conveyor extending along said cage battery at an elevation above floor level which provides below said conveyor an unrestricted walkway through which a person may walk upright to afford free access to and egress from said battery at any position along the battery, conveyor means for transporting eggs from all of the cages of said battery to said outfeed conveyor, said conveyor means including transfer conveyor means having spaced egg receiving means thereon and at least one horizontal run above said outfeed conveyor elevation, and having means for transporting the eggs upwardly to said horizontal run and effecting tilting of said egg receiving means to release eggs in succession for lowering of the eggs to said outfeed conveyor, and said outfeed conveyor transporting the eggs from said battery to a collection point.

2. An automatic egg collector according to claim 1 wherein:

said cage battery includes spaced cage blocks each containing several tiers of cages arranged one over the other, said outfeed conveyor extends along one end of said cage blocks, said conveyor means comprise feeder conveyors extending along said tiers of each block for transporting eggs from the adjacent cages to said one arm of the respective cage block, said transfer conveyor means comprises a transfer conveyor at said one end of each cage block for receiving eggs from all the feeder conveyors of the respective block and transporting the eggs upwardly to said horizontal run of the respective transfer conveyor, and said horizontal run of each transfer conveyor crosses over said outfeed conveyor.

3. In an automatic egg collector for an automated poultry handling system having a bank of poultry cages with several tiers each containing a number of cages disposed side by side, the combination comprising:

feeder conveyors to extend along said cage tiers for transporting eggs from the adjacent cages to one end of said conveyors, a transfer conveyor at said one end of said feeder conveyors having a run which travels upwardly past said one end of said feeder conveyors for receiving eggs from said feeder conveyors and transporting the eggs upwardly to an overhead outfeed station of the conveyor, transfer means for transferring eggs from said feeder conveyors to said transfer conveyor run, said transfer conveyor run having laterally spaced egg receiving sections equal in number to said feed conveyors and each adapted to receive eggs from a particular feeder conveyor, and said transfer means including means for transferring eggs from each feeder conveyor to its respective egg receiving section of the transfer conveyor in timed relation to the movement of the transfer conveyor.

4. An automatic egg collector according to claim 3 wherein:

said transfer means comprises a carrousel conveyor at the end of each feeder conveyor having an infeed opening to the respective feeder conveyor, an outfeed opening to the respective egg receiving section of the transfer conveyor, and conveyor means for transporting eggs in succession from said infeed opening to said outfeed opening.

5. An automatic egg collector according to claim 3 wherein:

said transfer means comprises an egg guideway leading from the end of each feeder conveyor to the respective egg receiving section of the transfer conveyor, and conveyor means for transporting eggs in succession through said guideway from the feeder conveyor to the transfer conveyor.

6. An automatic egg collector according to claim 3 including:

an overhead outfeed conveyor movable through said outfeed station for receiving eggs from said transfer conveyor and located at an elevation above floor level which provides below said outfeed conveyor an unrestricted walkway through which a person may walk to afford free access to and egress from said cage bank, and said transfer conveyor being movable along a path crossing over said outfeed conveyor and including means for effecting transfer of eggs from said transfer conveyor to said outfeed conveyor as said transfer conveyor passes over the outfeed conveyor.

7. An egg conveyor for an automated poultry handling system comprising:

a conveyor member having a generally vertical run along which said member travels in an upward direction to an outfeed station at the upper end of said run, and generally cup-shaped egg receivers which are spaced along said conveyor member and open upwardly along said run for transporting eggs upwardly along said run to and discharging the eggs from the conveyor at said out feed station, a generally cup-shaped upwardly opening egg receiving basket stationarily mounted along said conveyor run in the path of said conveyor egg receivers, said basket comprising arcuate fingers spaced laterally of said conveyor member, said conveyor egg receivers comprise arcuate fingers spaced laterally of said conveyor member to pass between the basket fingers for elevating eggs from the basket, said conveyor member comprising a pair of endless conveyor chains, and rods extending between and releasably attached to said chains, and said egg remover fingers being slidably mounted side by side on said rods for removal from the rods when the rods are detached from said chains.

8. A conveyor according to claim 7 in combination with:

conveyor means for transporting eggs in succession to said egg basket in timed relation to the movement of said conveyor member, an overhead outfeed conveyor movable through said outfeed station for receiving eggs from said first mentioned conveyor member and located at an elevation above floor level which provides an unrestricted walkway below said outfeed conveyor, said conveyor member crossing over said outfeed conveyor at said station, and means for effecting transfer of eggs from said conveyor member to said outfeed conveyor as said conveyor member passes over said outfeed conveyor.

9. An egg conveyor system for an automated poultry handling system comprising:

an overhead outfeed conveyor located at an elevation above floor level which provides an unrestricted walkway below said conveyor, a second conveyor for transporting eggs upwardly to said outfeed conveyor including an endless conveyor member having a generally vertical run along which the conveyor member travels in the upward direction, a horizontal run extending from the upper end of said vertical run over said outfeed conveyor, and a return run extending from said horizontal run to the lower end of said vertical run, and generally cup-shaped egg receivers spaced along said conveyor member and which open upwardly along said vertical run and horizontally along said horizontal run, means for feeding eggs to said egg receivers at one position along said vertical run of said second conveyor, whereby said eggs are carried upwardly to said horizontal run of the latter conveyor and the eggs roll from said receivers as the latter enter said horizontal run of the latter conveyor, and means below said horizontal conveyor run for receiving the eggs from the latter run and effecting movement of the eggs onto said outfeed conveyor.

10. A conveyor system according to claim 9 wherein: said last mentioned egg receiving means comprises an inclined ramp which slopes downwardly to said outfeed conveyor and along which the eggs roll to the outfeed conveyor.

11. A conveyor system according to claim 10 wherein:

said ramp has a resiliently compliant upper surface for cushioning impact of said eggs on said ramp.

12. A conveyor system according to claim 9 wherein: said last mentioned means comprises an inclined ramp which slopes downwardly to said outfeed conveyor and along which the eggs roll to the outfeed conveyor, and said conveyor system includes egg retarder means for regulating the rate of rolling movement of the eggs along said ramp and spacing the eggs on the ramp.

13. A conveyor system according to claim 12 wherein:

said egg retarder means comprise egg retarders carried by said conveyor member which depend below said horizontal conveyor run for engagement by the eggs on said ramp.

14. A conveyor system according to claim 13 wherein:

said ramp has a resiliently compliant upper surface for cushioning impact of said eggs on said ramp.

15. An automatic egg collector for an automated poultry handling system having a battery of poultry cages including spaced blocks of cages each containing several tiers with a number of cages disposed side by side in each tier, comprising:

an overhead outfeed conveyor extending along said cage battery at one end of said cage blocks and located at an elevation above floor level which provides an unrestricted walkway affording free access to and egress from said battery at any position therealong, feeder conveyors extending along said tiers of each cage block for transporting eggs from the adjacent cages to said one end of the respective block, a transfer conveyor at said one end of each cage block for receiving eggs from all the feeder conveyors of the respective block and transporting the eggs upwardly to said outfeed conveyor, said transfer conveyor including an endless conveyor member having a generally vertical run extending upwardly past the adjacent ends of the respective feeder conveyors, a horizontal run extending from the upper end of said vertical run over said outfeed conveyor, and a return run extending from said horizontal run to the lower end of said vertical run, generally cup-shaped egg receivers spaced along said conveyor member which open upwardly along said vertical run and horizontally along said horizontal run, and means for driving said conveyor member in a direction such that said receivers travel upwardly along said vertical run, transfer means for feeding eggs from each feeder conveyor to the egg receivers of the respective transfer conveyor, whereby the eggs are carried upwardly to the horizontal run of the latter conveyor and then roll from the egg receivers as the latter enter the horizontal run, an inclined ramp located below said horizontal run of each transfer conveyor which receives the eggs from the overlying horizontal run and along which the eggs roll onto said outfeed conveyor, and egg retarders carried by said conveyor member of each transfer conveyor which depend below the horizontal run of the respective conveyor for engagement by the eggs on the underlying ramp to regulate their rate of rolling motion and space the eggs on the ramp.

16. An egg collector according to claim 15 wherein: said transfer means comprise upwardly opening egg baskets along the vertical runs of the respective transfer conveyors into which the eggs are fed from the respective feeder conveyors, said egg baskets comprise arcuate fingers spaced laterally of the respective transfer conveyor members, and said transfer conveyor egg receivers comprise arcuate fingers which are spaced laterally of the respective conveyor members to pass between the fingers of the respective egg baskets to elevate eggs from the baskets.

17. An egg collector according to claim 15 wherein:

said egg receivers of each transfer conveyor are arranged in egg receiving sections spaced laterally of the respective conveyor member and equal in number to the cage tiers in the respective cage block, and said transfer means of each cage block feed eggs from the respective feeder conveyors to the egg receivers in different sections of the respective transfer conveyor.

* * * * *